US008976557B2

(12) United States Patent
Pouliquen et al.

(10) Patent No.: US 8,976,557 B2
(45) Date of Patent: Mar. 10, 2015

(54) REACTIVE ENERGY COMPENSATOR COMPRISING N PARALLEL INVERTERS, N CAPACITOR BANKS, AND MEANS FOR CONNECTING THE BANKS THROUGH PASSIVE ELECTRICAL COMPONENTS

(75) Inventors: Jean-Louis Pouliquen, Belfort (FR); Mathieu Morati, Belfort (FR); Matthieu Urbain, Vandoeuvre-les-Nancy (FR); Nicolas Lapassat, Villebon-sur-Yvette (FR)

(73) Assignee: GE Energy Power Conversion Technology Ltd., Warwickshire (GB)

( * ) Notice: Subject to any disclaimer, the term of this patent is extended or adjusted under 35 U.S.C. 154(b) by 173 days.

(21) Appl. No.: 13/594,025

(22) Filed: Aug. 24, 2012

(65) Prior Publication Data

US 2013/0188406 A1 Jul. 25, 2013

(30) Foreign Application Priority Data

Aug. 25, 2011 (FR) ...................................... 11 57528

(51) Int. Cl.
*H02M 7/48* (2006.01)
*H02M 7/537* (2006.01)
*H02J 3/18* (2006.01)
*H02M 7/487* (2007.01)

(52) U.S. Cl.
CPC ............. *H02M 7/537* (2013.01); *H02J 3/1842* (2013.01); *H02M 7/487* (2013.01); *Y02E 40/22* (2013.01)
USPC .......................................................... 363/71

(58) Field of Classification Search
CPC ...... H02M 7/537; H02M 7/487; H02J 3/1842
USPC ................................ 363/65, 71; 323/205, 207
See application file for complete search history.

(56) References Cited

U.S. PATENT DOCUMENTS

| 3,963,978 | A | 6/1976 | Kelley, Jr. et al. | |
| 4,647,837 | A | 3/1987 | Stemmler | |
| 5,617,012 | A | 4/1997 | Murakami | |
| 6,225,791 | B1 | 5/2001 | Fujii et al. | |
| 8,780,593 | B2 * | 7/2014 | Wang et al. | 363/71 |
| 2013/0176757 | A1 * | 7/2013 | Morati et al. | 363/71 |
| 2014/0140112 | A1 * | 5/2014 | Zhou et al. | 363/40 |

FOREIGN PATENT DOCUMENTS

| FR | 2766635 A1 | 1/1999 |
| JP | 2004072864 A | 3/2004 |

OTHER PUBLICATIONS

French Search report and written opinion for application No. 1157528 dated Jun. 18, 2012.

* cited by examiner

Primary Examiner — Matthew Nguyen
(74) Attorney, Agent, or Firm — Parks Wood LLC

(57) ABSTRACT

A reactive energy compensator is provided. The compensator is connected to an alternating electrical network including M phase(s), M being an integer greater than or equal to 1. The compensator includes M connection terminals, N banks of capacitor(s) capable of providing reactive energy, N being an integer greater than or equal to 2, N two-way voltage inverters, connected to each other in parallel and each connected to a unique capacitor bank, each inverter being able to convert a direct current into an alternating current including M phase(s) in one direction and the alternating current into direct current in the other direction, each inverter including first and second input terminals and M output terminal(s), the input terminals being connected to the corresponding capacitor bank, each output terminal corresponding to a phase of the alternating current and being connected to a corresponding connection terminal, and a device for balancing the voltage of the N capacitor banks.

11 Claims, 2 Drawing Sheets

REACTIVE ENERGY COMPENSATOR COMPRISING N PARALLEL INVERTERS, N CAPACITOR BANKS, AND MEANS FOR CONNECTING THE BANKS THROUGH PASSIVE ELECTRICAL COMPONENTS

CROSS-REFERENCE TO RELATED APPLICATIONS

This application claims benefit of French patent application serial number 11 57528, filed Aug. 25, 2011 which is herein incorporated by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION (1) Field of the Invention

The present invention relates to a reactive energy compensator that can be electrically connected to an alternating electrical network.

(2) Description of Related Art including information disclosed under 37 CFR 1.97 and 1.98.

A reactor energy compensator can be electrically connected to an alternating electrical network including M phase(s), M being an integer greater than or equal to 1, the compensator comprising:

M connection terminals for connecting to the alternating network,
N banks of capacitor(s) capable of providing reactive energy, N being an integer greater than or equal to 2,
N two-way voltage inverters, connected to each other in parallel and each connected to a unique capacitor hank, each inverter being able to convert a direct current into an alternating current including M phase(s) in one direction and the alternating current into direct current in the other direction, each inverter including first and second input terminals and M output terminal(s), the input terminals being connected to the corresponding capacitor bank, each output terminal corresponding to a phase of the alternating current and being connected to a corresponding connection terminal,
a device for balancing the voltage of the N capacitor banks.

A reactive energy compensator of the aforementioned type is known. The reactive energy compensator comprises polyphase inverters connected to each other in parallel, each inverter being bidirectional, electrically connected in input to a unique capacitor bank capable of supplying reactive energy and electrically connected in output to the alternating network. Such a reactive energy compensator makes it possible to reduce any disruptions of the alternating network due to a disrupting charge connected to the network, such as an arc furnace. The compensator comprises control means for controlling the voltage inverters according to a control law, and the voltage of each capacitor bank is balanced by means of the control of the voltage inverters.

However, when the disruptions of the alternating network are significant, the control using the control means of the voltage inverters no longer makes it possible to balance the voltage of each capacitor bank. Voltage unbalances then appear between the different capacitor banks, which then creates a divergence of the voltages of the different capacitor banks, and requires that the reactive energy compensator be stopped.

BRIEF SUMMARY OF THE INVENTION

The aim of the invention is to propose a reactive energy compensator making it possible to improve the balancing of the voltage of the capacitor banks in case of disruptions due to a charge connected to the alternating network.

To that end, the invention relates to a reactive energy compensator of the aforementioned type, characterized in that the balancing device includes first electrical connection means for connecting to the first input terminal through passive electrical components.

According to other advantageous aspects of the invention, the reactive energy compensator comprises one or more of the following features, considered alone or according to all technically possible combinations:

the balancing device includes second electrical connecting means for connecting the second input terminals through passive electrical components;
the connecting means are made up of passive electrical components;
the connecting means have an impedance greater than or equal to 10 ohms, preferably greater than or equal to 15 ohms;
the first connecting means include N first resistances; each first resistance having two ends and being connected by one end to a first corresponding input terminal and by the other end to a first shared point;
the first connecting means include N−1 first resistances, each first resistance being connected between the first input terminals of two successive inverters;
the first connecting means also include a first electromagnetic coil connected in series to the first resistance;
the second connecting means include N second resistances, each second resistance having two ends and being connected by one end to a second corresponding input terminal and by the other end to a second shared point;
the second connecting means include N−1 second resistances, each second resistance being connected between the second input terminals of two successive inverters;
the second connecting means also include a second electromagnetic coil connected in series to the second resistance;
the compensator comprises an electromagnetic coupling device connected between the output terminals of the N inverters and the connecting terminal(s).

BRIEF DESCRIPTION OF THE DRAWINGS

The features and advantages of the invention will appear upon reading the following description, provided solely as an example, and done in reference to the appended drawings, in which.

DETAILED DESCRIPTION OF THE INVENTION

Figure 1:
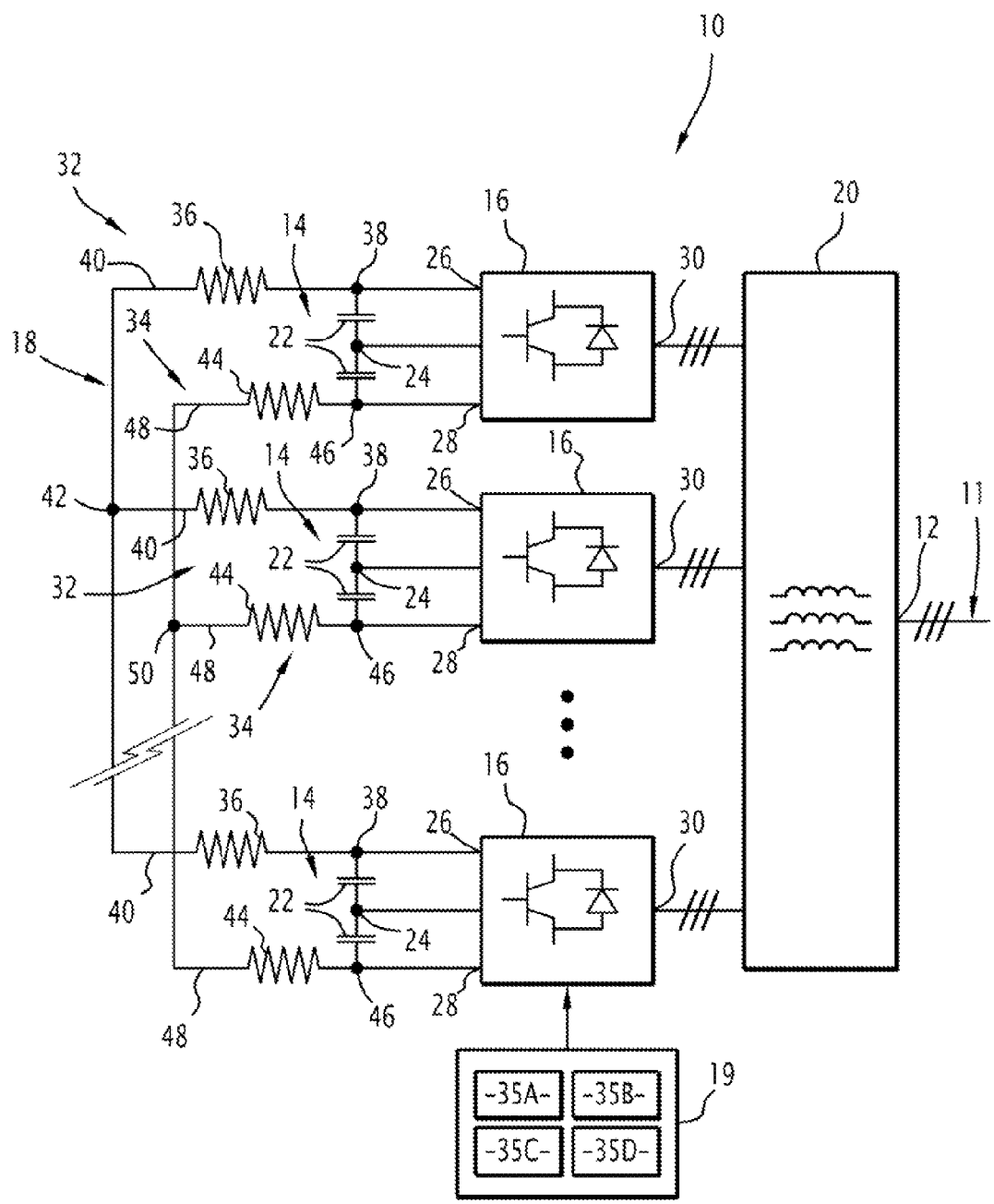
FIG. 1 is a diagrammatic illustration of a reactive energy compensator according to a first embodiment of the invention.

FIG. 1 illustrates a reactive energy compensator 10 capable of being electrically connected to an alternating electric network 11 including M phase(s), M being an integer greater than or equal to 1.

The reactive energy compensator 10 comprises M terminals 12 for connecting to the alternating network 11, N capacitor banks 14 and N voltage inverters 16 connected to each other in parallel and each connected to a unique capacitor bank 14, each inverter 16 including electronic switches that can be controlled to open and close for converting the voltage. N is an integer greater than or equal to 2.

The reactive energy compensator 10 comprises a device 18 for balancing the voltage of the N capacitor banks and a device 19 for calculating control signals for the electronic switches of the inverters 16.

Additionally, the reactive energy compensator 10 comprises an electromagnetic coupling device 20 connected at the outlet of the N voltage inverters 16.

The reactive energy compensator 10 is capable of compensating the reactive energy variations on the alternating network 11 via the capacitor banks 14 capable of providing reactive energy to the network 11.

In the example embodiment of FIG. 1, M is equal to 3, and the alternating electrical network 11 is a tri-phase network.

Each connecting terminal 12 corresponds to a phase of the alternating current of the network.

The N capacitor banks 14 are separate from one another. Each bank 14 includes two capacitors 22 connected in series and connected to each other by a middle point 24.

It is specified that, in the continuation of the description, the side of the inverters 16 connected to the capacitor bank 14 corresponds, conventionally, to the input of the inverter, and that the side of the inverters 16 connected to the alternating network 11 then corresponds to the outlet of the inverter.

Each inverter 16 is bidirectional and capable of converting direct current to alternating current having M phase(s) in one direction and alternating current to direct current in the other direction.

Each inverter 16 includes a first input terminal 26, a second input terminal 28, and N output terminal(s) 30, the input terminals 26, 28 being connected to a unique capacitor bank 14, each output terminal 30 corresponding to a phase of the alternating current.

Each voltage inverter 16 is known in itself, and has a topology of the neutral point clamped (NPC) type. Alternatively, each voltage inverter 16 has a topology of the neutral point piloted (NPP) type.

The balancing device 18 includes first means 32 for electrical connection of the first input terminals 26.

Additionally, the balancing device 18 includes second electrical connection means 34 of the second input terminals 28.

The calculating device 19 includes, for each inverter 16, a device 35A for determining a carrier signal, a device 35B for calculating a modulating signal, and means 35C for calculating control signals as a function of the difference between the carrier signal and the modulating signal. Additionally, the calculating device 19 also includes means 35D for time shifting the carrier signals of at least two corresponding inverters 16. In the embodiment of FIG. 1, the time shift means 35D are time shift means for the carrier signals of all of the inverters 16. The time shift between the carrier signals of two successive inverters 16 is, for example, equal to $2\times\pi/N/N$.

The electromagnetic coupling device 20 is connected between the output terminals 30 of the N inverters and the three connecting terminals 12 corresponding to each of the phases of the triphase current of the network 11.

The electromagnetic coupling device 20 is known in itself, and includes N×M first electromagnetic coupling coils, N×M second electromagnetic coupling coils, and N×M magnetic cores, not shown. Each electromagnetic coil is wound around a respective core, and the second electromagnetic coupling coils are connected to the first electromagnetic coupling coils in the manner described in document FR 2 940 550 A1.

The capacitors 22 are, for example, identical and have the same capacity.

The first and second connecting means 32, 34 include passive electrical components. In the example embodiment of FIGS. 1 and 2, the first and second connecting means 32, 34 are made of passive electrical components.

The first connecting means 32 include N first resistances 36, each first resistance 36 having two ends 38, 40 and being connected by one end 38 to a first corresponding input terminal 36 and by the other end 40 to a first shared point 42. In the embodiment of FIG. 1, the first connecting means 32 are made up of N first resistances 36.

In an alternative that is not shown, the first connecting means 32 include N−1 first resistance(s), each first resistance being connected between the first input terminals 26 of two successive inverters 16. The first connecting means are, for example, made up of N−1 first resistances.

The second connecting means 34 include N second resistances 44, each second resistance 44 having two ends 46, 48 and being connected by one end 46 to a second corresponding input terminal 28 and by the other end 48 to a second shared point 50. In the example embodiment of FIG. 1, the second connecting means 34 are made up of N second resistances 44.

In an alternative that is not shown, the second connecting means 34 include N−1 second resistances), each second resistance being connected between the second input terminals 28 to two successive inverters 16. The second connecting means 34 are, for example, made up of N−1 second resistances.

Each first resistance 36 has a first impedance R1 with a value greater than or equal to 10 ohms, preferably greater than or equal to 15 ohms. The value of the first impedance R1 of the first resistances 36 is, for example, comprised between 10 ohms and 60 ohms, preferably comprised between 15 ohms and 50 ohms, also preferably equal to 15 ohms or 48 ohms.

Each second resistance 44 has a second impedance R2 with a value greater than or equal to 10 ohms, preferably greater than or equal to 15 ohms. The value of the second impedance R2 of the two resistances 44 is for example, comprised between 10 ohms and 60 ohms, preferably comprised between 15 ohms and 50 ohms, also preferably equal to 15 ohms or 48 ohms.

In the example embodiment of FIG. 1, the value of the second impedance R2 is equal to that of the first impedance R1. The value of the impedances R1, R2 is, for example, equal to 15 ohms for inverters 16 with a voltage of 3.3 kV between phases and capacitor banks 14 with a voltage of 5 kV at their terminals. Alternatively, the value of the impedances R1, R2 is equal to 48 ohms for inverters 16 with a voltage of 9.9 kV between phases and capacitor banks 14 with a voltage of 15 kV at their terminals.

The operation of the reactive energy compensator 10 will now be explained using FIG. 1.

When disruptions appear in the alternating network 11, and that the voltage of the terminals of each capacitor bank 14 is no longer substantially identical from one inverter 16 to the next, despite the control of the inverters 16 by means of the calculating device 19, then the first electrical connecting means 32, or even as a supplement the second electrical connecting means 34, reduce the voltage unbalances by ensuring circulation of the electrical charges from a bank 14 with an excess of electrical charges toward a bank 14 with a lack of electrical charges. In other words, the presence of the electrical connecting means 32, 34 makes it possible to improve the balancing of the voltage of the capacitor banks 14 in the event of disruptions due to a charge connected to the alternating network 11.

The time constant of the regulation of the voltage of the capacitor banks 14 depends on the value of the impedances R1, R2 of the resistances 36, 44.

To determine the value of the impedances R1, R2, the maximum unbalance current $I_{unbalance}$ is estimated by simulation, and a predetermined maximum allowed voltage divergence value $\Delta V_{max}$ is chosen. The maximum value of the sum of the impedances $(R1+R2)_{max}$, is then given by the following equation:

$$(R1+R2)_{max}=R1_{max}+R2_{max}=\Delta V_{max}/I_{unbalance} \quad (1)$$

For $\Delta V_{max}$=150 V and $I_{unbalance}$=2.5 A, one obtains $R1_{max}+R2_{max}$=60 ohms. By choosing R1 equal to R2, and taking a margin factor of two relative to the maximum values, one finds a value of the impedances R1, R2 equal to 15 ohms.

Furthermore, the joule losses associated with the balance currents are limited, since with impedances R1, R2 of equal values, for example, at 15 ohms, the direct balance current does not exceed peak 3 A for six inverters 16 connected in parallel.

Thus, using passive electrical components, such as the first resistances 36 and the second resistances 44, makes it possible to balance the voltage of N capacitor banks 14 in the reactive energy compensator 10, the passive electrical components forming electrical connecting means for the N first input terminals 26 and the N second input terminals 28.

Figure 2:
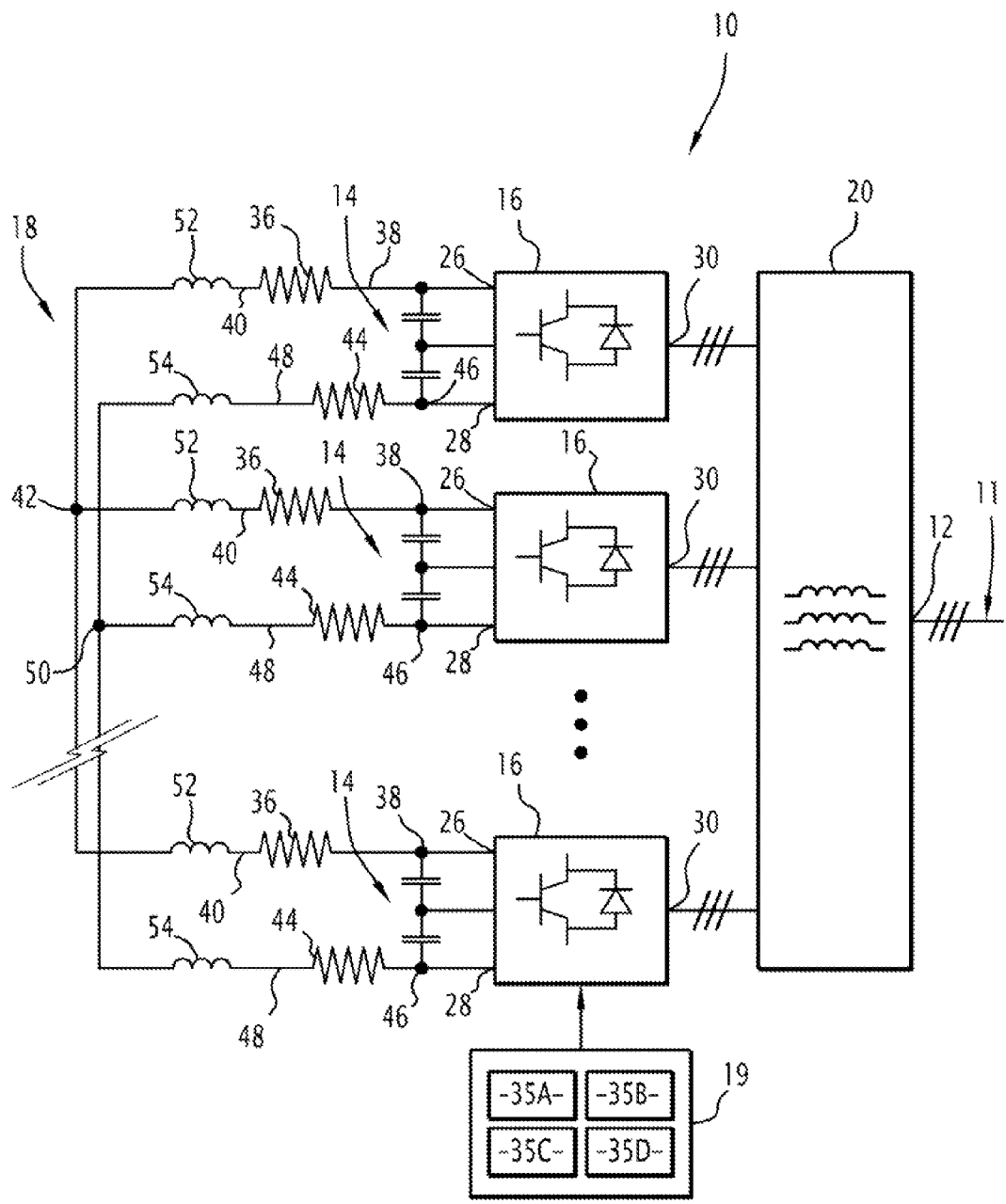
FIG. 2 is a view similar to that of FIG. 1 according to a second embodiment of the invention.

FIG. 2 illustrates a second embodiment of the invention in which the elements similar to the first embodiment, previously described, are identified using identical references, and are not described again.

According to the second embodiment, the first connecting means 32 also include a first electromagnetic coil 52 connected in series to at least one first resistance 36.

In the example embodiment of FIG. 2, the first connecting means 32 include a first electromagnetic coil 52 connected in series to each first resistance 36.

In the example embodiment of FIG. 2, the first connecting means are made up of N first resistances 36 and N first electromagnetic coils 52.

In one alternative not shown, when the first connecting means 32 include first resistances connected between the first input terminals 26 of two successive inverters 16, the first connecting means 32 are made up of N−1 first resistances and N−1 first electromagnetic coils.

Additionally, the second connecting means 34 also include a second electromagnetic coil 54 connected in series to at least one second resistance 44.

The second connecting means 34 include, for example, a second electromagnetic coil 54 connected in series to each second resistance 44.

In the example embodiment of FIG. 2, the second connecting means 34 are made up of N second resistances 44 and N second electromagnetic coils 54.

In one alternative that is not shown, when the second connecting means 34 include second resistances connected between the second input terminals 28 of two successive inverters 16, the second connecting means 34 are made up of N−1 second resistances and N−1 second electromagnetic coils.

The operation of this second embodiment is similar to that of the first embodiment.

The advantages of this second embodiment are similar to those of the first embodiment.

When the carrier signals are time shifted between the inverters 16 by the shifting means 35D, additional alternating currents appear at frequencies which are a multiple of the carrier frequency. These currents are capable of creating additional losses greater than the joule effect losses created by the direct balance currents. The first election magnetic coils 52, or even, additionally, the second electromagnetic coils 54, then make it possible to damp these additional alternating currents, and therefore to reduce the additional losses. Furthermore, the electromagnetic coils 52, 54 are non-dissipating elements, and therefore do not increase the joule effect losses.

One can thus see that the reactive energy compensator according to the invention makes it possible to improve the balance of the voltage of the N capacitor banks 14, in particular in the event of disruptions of the alternating current of the network due to the presence of a disrupting charge connected to the alternating network 11.

The invention claimed is:

1. A reactive energy compensator that can be electrically connected to an alternating electrical network including M phase(s), M being an integer greater than or equal to 1, the compensator comprising:

M connecting terminals for connecting to the alternating network,

N banks of capacitor(s) capable of providing reactive energy, N being an integer greater than or equal to 2, N two-way voltage inverters, connected to each other in parallel and each connected to a unique capacitor bank, each inverter being able to convert a direct current into an alternating current including M phase(s) in one direction and the alternating current into direct current in the other direction, each inverter including first and second input terminals and M output terminal(s), the input terminals being connected to the corresponding capacitor bank, each output terminal corresponding to a phase of the alternating current and being connected to a corresponding connection terminal, a device for balancing the voltage of the N capacitor banks, characterized in that the balancing device includes first electrical connecting means for connecting to the first input terminals through passive electrical components.

2. The compensator according to claim 1, wherein the balancing device includes second electrical connecting means for connecting the second input terminals through passive electrical components.

3. The compensator according to claim 2, wherein the first connecting means and the second connecting means are made up of passive electrical components.

4. The compensator according to claim 2, wherein the first connecting means and the second connecting means have an impedance greater than or equal 15 ohms.

5. The compensator according to claim 1, wherein the first connecting means include N first resistances, each first resistance having two ends and being connected by one end of the two ends to a first corresponding input terminal and by the other end of the two ends to a first shared point.

6. The compensator according to claim 1, wherein the first connecting means includes N−1 first resistances, each first resistance being connected between the first input terminals of two successive inverters.

7. The compensator according to claim 5, wherein the first connecting means further comprises a first electromagnetic coil connected in series to each first resistance.

8. The compensator according to claim 2, wherein the second connecting means includes N second resistances, each second resistance having two ends and being connected by one end of the two ends to a second corresponding input terminal and by the other end of the two ends to a second shared point.

9. The compensator according to claim 2, wherein the second connecting means includes N−1 second resistances, each second resistance being connected between the second input terminals of two successive inverters.

10. The compensator according to claim 8, wherein the second connecting means further comprises a second electromagnetic coil connected in series to the second resistance.

11. The compensator according to claim 1, wherein the compensator comprises an electromagnetic coupling device connected between the M output terminals of the N two-way voltage inverters and the M connecting terminal(s).

\* \* \* \* \*